United States Patent
Tamai et al.

(10) Patent No.: US 9,246,369 B2
(45) Date of Patent: Jan. 26, 2016

(54) ELECTRIC MOTOR

(71) Applicant: GM GLOBAL TECHNOLOGY OPERATIONS LLC, Detroit, MI (US)

(72) Inventors: Goro Tamai, West Bloomfield, MI (US); Shawn H Swales, Canton, MI (US); Peter Bostwick, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 397 days.

(21) Appl. No.: 13/802,981

(22) Filed: Mar. 14, 2013

(65) Prior Publication Data

US 2014/0175918 A1 Jun. 26, 2014

Related U.S. Application Data

(60) Provisional application No. 61/745,233, filed on Dec. 21, 2012.

(51) Int. Cl.
H02K 9/19 (2006.01)

(52) U.S. Cl.
CPC .................................. *H02K 9/19* (2013.01)

(58) Field of Classification Search
None
See application file for complete search history.

(56) References Cited

U.S. PATENT DOCUMENTS

| | | | |
|---|---|---|---|
| 4,870,307 A * | 9/1989 | Kitamura et al. | 310/54 |
| 2010/0013329 A1* | 1/2010 | Heidenreich et al. | 310/54 |
| 2011/0156508 A1 | 6/2011 | Minemura et al. | |
| 2011/0316367 A1* | 12/2011 | Takahashi et al. | 310/54 |
| 2012/0091834 A1 | 4/2012 | Bradfield | |

FOREIGN PATENT DOCUMENTS

| | | |
|---|---|---|
| CN | 102144349 A | 8/2011 |
| CN | 102468700 A | 5/2012 |
| JP | 2003250247 A | 9/2003 |
| WO | 2012047481 A2 | 4/2012 |

* cited by examiner

*Primary Examiner* — Tran Nguyen
(74) *Attorney, Agent, or Firm* — Quinn Law Group, PLLC

(57) ABSTRACT

An electric motor includes a rotor and a stator. The stator surrounds the rotor, has a top half, a bottom half, and wire windings, and is fixed with respect to the drive-unit housing. The stator is cooled by gravity feed via a fluid supplied by an external source and flowing onto and past the top half. The motor also includes a fluid dam fixed relative to the stator. The fluid dam is configured to guide the fluid around the stator and shield the rotor from the fluid flowing past the stator thereby limiting an amount of the fluid between the rotor and the stator such that spin losses in the electric motor are controlled. An electro-mechanical drive-unit employing the above described electric motor is also disclosed.

20 Claims, 4 Drawing Sheets

ELECTRIC MOTOR

CROSS-REFERENCE TO RELATED APPLICATIONS

This application claims the benefit of U.S. Provisional Patent Application No. 61/745,233 filed on Dec. 21, 2012, which is hereby incorporated by reference in its entirety.

TECHNICAL FIELD

The disclosure relates to an electric motor for use in a powertrain of a motor vehicle.

BACKGROUND

To produce a more efficient vehicle, hybrid vehicle powertrains combine an electric motor(s) and a conventional internal combustion engine. Torque from the engine and the electric motor(s) is typically channeled to the vehicle's driven wheels via a transmission. Efficiency of a hybrid vehicle powertrain is typically related to the driving conditions and percentage of time that the engine must be run in addition to or in place of the electric motor to power the vehicle.

Some hybrid powertrains employ a single electric motor in combination with the engine. In such powertrains, transmission output, and hence vehicle speed, is directly related to the speeds and torques of the engine and the electric motor. Other hybrid powertrains employ two electric motors in combination with the engine to power the vehicle. Additionally, a vehicle may employ purely electric propulsion. In such a case, the vehicle's powertrain will have one or more motor-generators and no internal combustion engine.

In either a hybrid or purely electric powertrain the electric motor(s) are operatively connected to a transmission having planetary gearing such that torque and speed of the electric motors may be selected independently of vehicle speed and desired acceleration. In a hybrid powertrain, control of the engine is typically achieved by varying individual torque contribution from the electric motor(s). Thus, such hybrid and purely electric powertrains may each provide selectable torque contribution from their electric motors, and in the case of the hybrid powertrain may similarly provide a selectable torque contribution from the engine to drive the subject vehicle.

SUMMARY

An electric motor includes a rotor and a stator. The stator surrounds the rotor, has a top half, a bottom half, and wire windings, and is fixed with respect to the drive-unit housing. The stator is cooled by gravity feed via a fluid supplied by an external source and flowing onto and past the top half. The motor also includes a fluid dam fixed relative to the stator. The fluid dam is configured to guide the fluid around the stator and shield the rotor from the fluid flowing past the stator, thereby limiting an amount of the fluid between the rotor and the stator such that spin losses in the electric motor are controlled.

The electric motor may also include a cup disposed directly below the bottom half of the stator and configured to catch the fluid that is guided around the stator. The cup may define a volume that is sufficient to immerse and cool at least a portion of the bottom half of the stator in the caught fluid.

The cup may be fixed relative to the stator.

The cup may have a bottom portion defining a drain that is configured to limit dwell time of the fluid within the cup.

The fluid dam may be fixed to the stator.

The fluid dam may have a curved shape and may be attached to the stator under the wire windings or above the wire windings.

The stator may include a plurality of slots. In such a case, the fluid dam may reduce dripping of the fluid through the plurality of slots and onto the rotor.

Each of the plurality of slots may be wrapped in a slot liner, while the fluid dam may be configured as an extension of the slot liner.

The wire winding may include wire loops, while the fluid dam may be configured as a plurality of plugs that are inserted into the wire loops.

An electro-mechanical drive-unit employing the above-described electric motor is also disclosed. The electro-mechanical drive-unit in conjunction with the power source, such as an internal combustion engine, may be part of a hybrid powertrain installed in and configured to launch and propel a vehicle.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
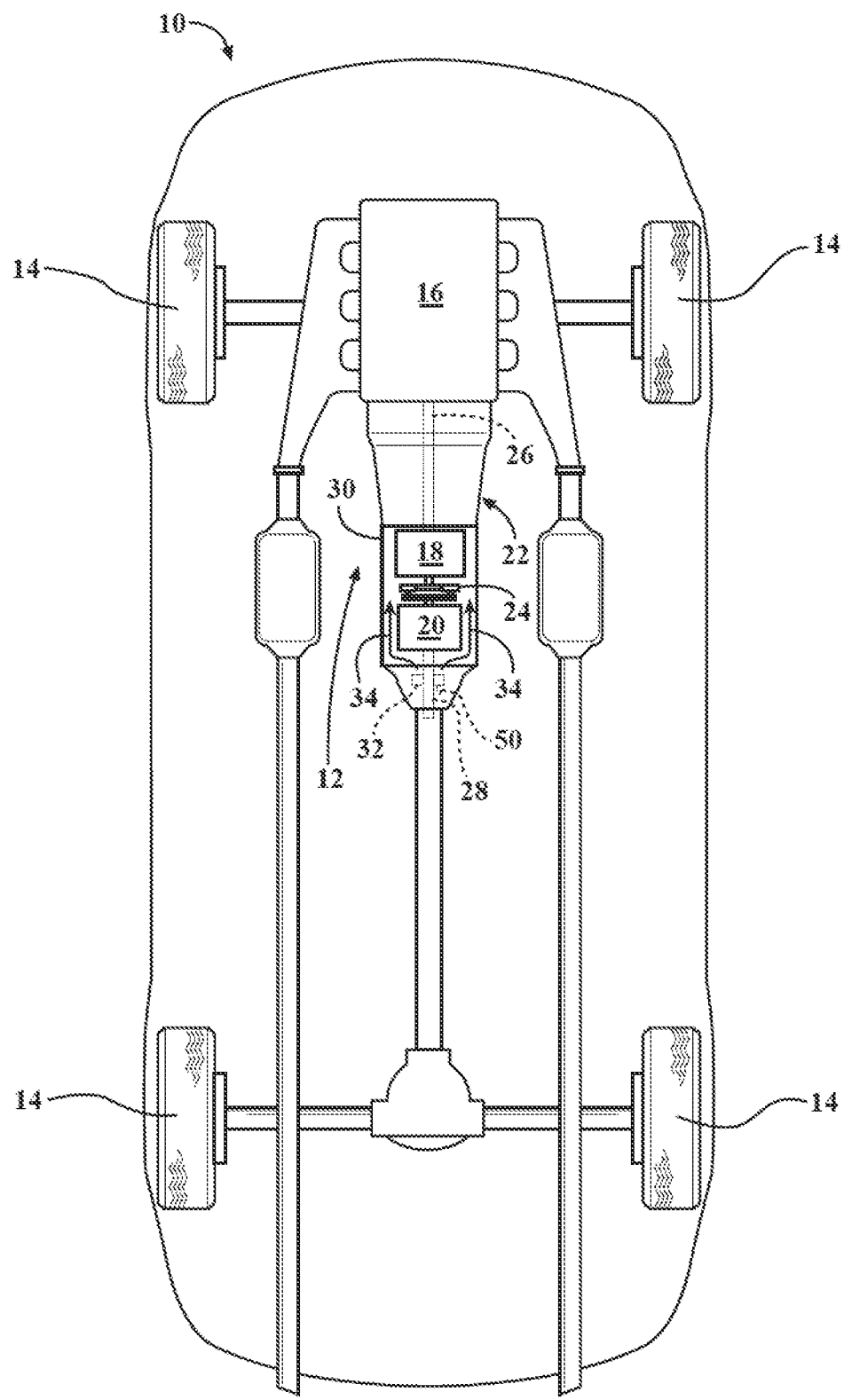
FIG. 1 is a schematic illustration of a hybrid electric vehicle employing an electrically variable transmission (EVT) having at least one motor/generator.

Referring to the drawings, wherein like reference numbers refer to like components, FIG. 1 illustrates a vehicle 10. The vehicle 10 includes a hybrid powertrain 12 configured to launch and propel the vehicle, i.e., to operate the vehicle in all speed ranges between low and high road speeds via drive wheels 14. As shown, the hybrid powertrain 12 includes multiple power sources, which may include an internal combustion engine 16, a first electric motor/generator 18, and a second electric motor/generator 20. The engine 16 is operatively connected to an electro-mechanical drive-unit that is depicted as an "electrically variable transmission" (EVT) 22. As additionally shown, first and second electric motor/generators 18, 20 are physically disposed inside the EVT 22.

As is known by those skilled in the art, an "electrically variable transmission" constitutes a gearing arrangement 24, which is typically configured as a transmission planetary gear train, operatively connected to each of the engine 16, the first motor/generator 18, and the second motor/generator 20.

Channeling respective torques of the engine 16 and the two motor/generators 18 and 20 to different members of the planetary gear train permits one of the power sources to either assist or balance the operation of any of the other two. Thus, the combination of one engine 16 and two motor/generators 16 and 20 operatively connected to the EVT 22 allows speeds and torques of the engine and motor/generators to be controlled and selected independently in order to power the vehicle 10 more efficiently.

The vehicle 10 additionally includes an energy storage system having one or more batteries that are not specifically shown, but known by those skilled in the art. The energy storage system is operatively connected to the motor/generators 18 and 20 such that the motor/generators may transfer torque to or receive torque from the engine 16. Although not shown, the vehicle 10 also includes a controller or an electronic control unit (ECU). The controller is operatively connected to the power sources and to the energy storage system for controlling the distribution of torque from the power sources to the gearing arrangement 24.

Although the hybrid powertrain 12 as shown includes the engine 16, the EVT 22 may also be connectable solely to the first and second electric motor/generators 18, 20. In such a case, the powertrain 12 would no longer be a hybrid type, but would become purely electric, and the EVT 22 may then be broadly described as an electro-mechanical drive-unit. For simplicity and clarity, the remainder of the present description will refer to the electro-mechanical drive-unit as EVT 22 being connected to the engine 16, as well as to the motor/generators 18, 20. Additionally, the connections of the hybrid powertrain 12, to be described in greater detail below, may permit an overall decrease in torque requirement from the combination of the first and the second motor/generators 18 and 20 while affording acceptable vehicle performance, as compared with other systems.

Figure 2:
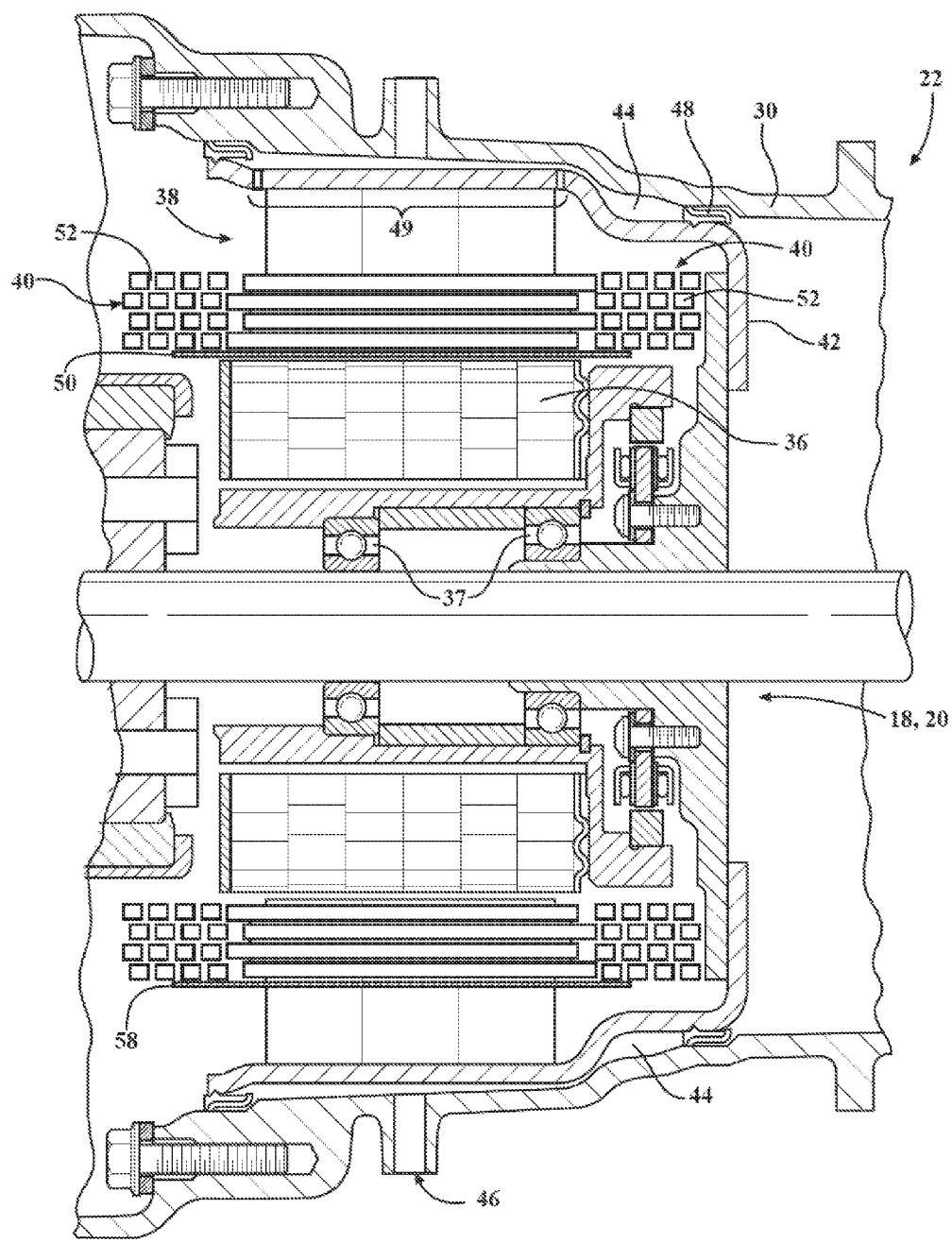
FIG. 2 is a partial close-up cross-sectional side view of the EVT shown in FIG. 1, wherein the motor/generator includes one embodiment of a fluid dam configured to shield the rotor of the motor/generator from cooling fluid and a cup configured to catch the fluid coming off the fluid dam.

As shown in FIG. 2, the EVT 22 includes an input member 26 which may be operatively connected to the engine 16 and an output member 28 which may be operatively connected to the drive wheels 14. The EVT 22 also includes a drive-unit housing 30 that functions as a stationary member to which certain torque transmitting devices (not shown) may be grounded on demand to affect shifts between distinct gear ratios. The gearing arrangement 24 is operatively connected to each of the output and input members 26, 28. The EVT 22 also includes a pump 32, which may be electrically driven by the energy storage system noted above. The pump 32 is configured to circulate a fluid 34, such as specially formulated transmission oil, inside the EVT 22.

As shown in FIG. 2, each of the first and second electric motor/generators 18, 20 includes a rotor 36 supported by bearings 37 and operatively connected to the gearing arrangement 24. Each of the first and second electric motor/generators 18, 20 also includes a stator 38 that surrounds the rotor 36. The stator 38 is fixed with respect to the drive-unit housing 30. An air gap 39 is present between the rotor 36 and the stator 38. The stator 38 includes wire windings 40. Each of the first and second electric motor/generators 18, 20 also includes a motor housing 42 configured to retain the rotor 36 and the stator 38 inside the EVT 22. The fluid 34 is supplied toward the motor/generators 18, 20 such that the stator 38 of the subject motor/generator is cooled via the fluid coming into contact with the stator by gravity feed.

A fluid cavity 44 may be formed between the drive-unit housing 30 and the motor housing 42. During operation of the EVT 22, the fluid cavity 44 may receive the fluid 34 directly from the pump 32 or via a supply feed 46 disposed in the drive-unit housing 30 and in fluid communication with the pump. The fluid cavity 44 may be sealed via a plurality of seals 48 disposed between the drive-unit housing 30 and the motor housing 42 (as shown), or remain open to other internal components of the EVT 22. In the case of the sealed fluid cavity 44, the fluid 34 may then be supplied from the cavity by gravity feed via feed channels 49.

Figure 3:
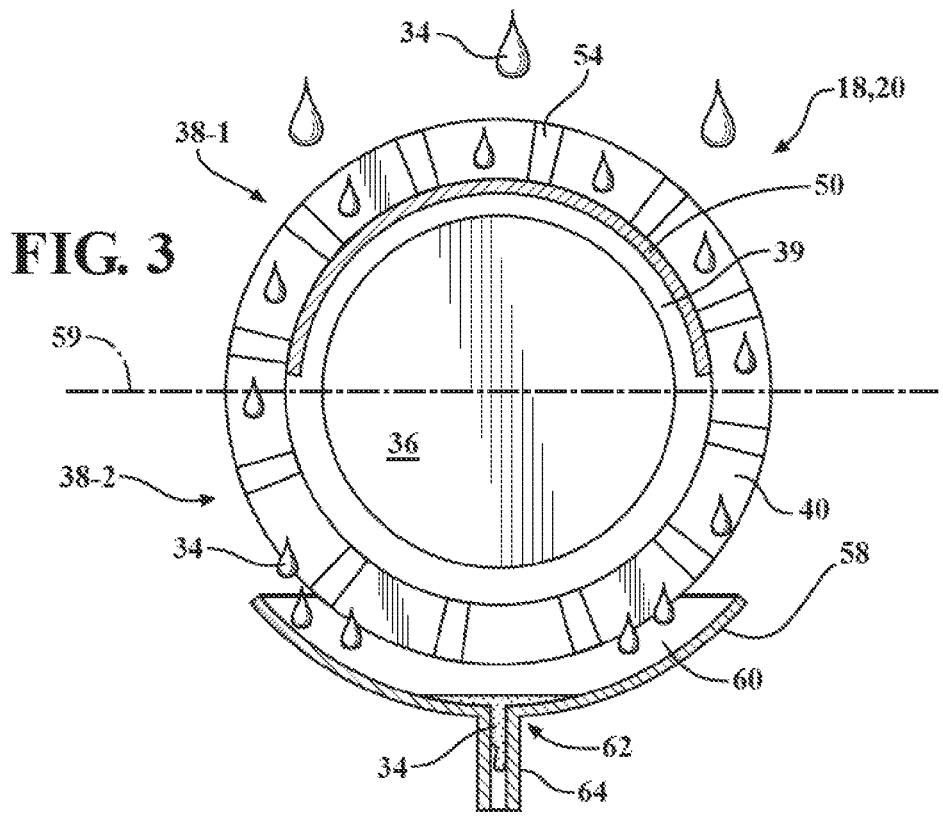
FIG. 3 is a cross-sectional front view of the motor/generator shown in FIG. 2.
Figure 4:
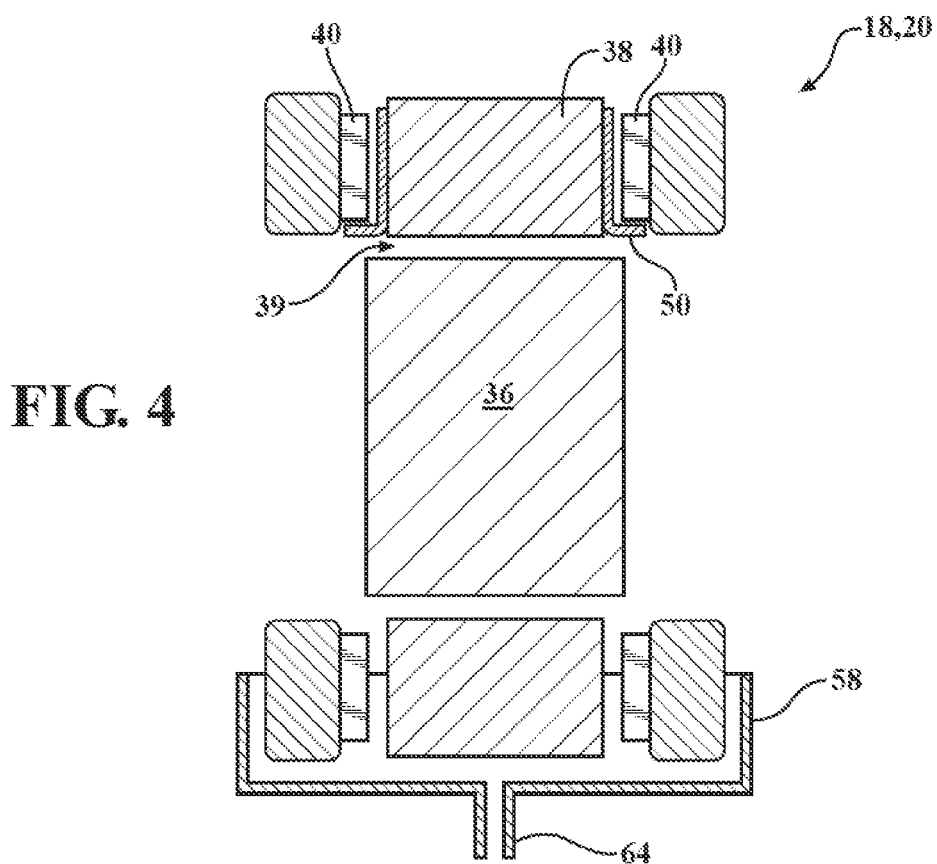
FIG. 4 is a cross-sectional side view of the motor/generator shown in FIG. 3.
Figure 5:
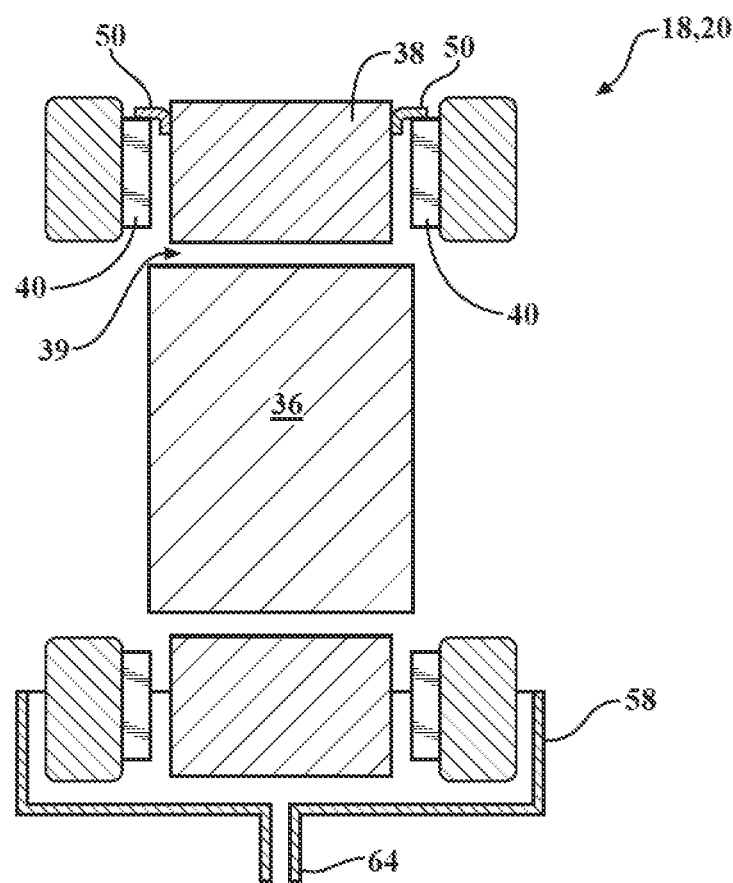
FIG. 5 is a cross-sectional front view of the motor/generator shown in FIG. 2, depicting a fluid dam according to another embodiment.

As shown in FIG. 3, the stator 38 has a top half 38-1 spanning approximately 180 degrees and a generally diametrically opposite bottom half 38-2 spanning the remaining approximately 180 degrees of the stator cross-section. The fluid 34 is fed into the vicinity of each motor/generator 18, 20 such that the stator 38 is cooled by the fluid flowing or dripping onto and past the top half 38-1. The fluid 34 may flow through the wire windings 40 and onto the rotor 36. Furthermore, the fluid 34 may collect between the rotor 36 and the stator 38, and may also generate hydraulic drag between those components, thereby increasing spin losses and decreasing operating efficiency of the subject motor/generator. As shown in FIG. 3, a fluid dam 50 is fixed relative to the motor housing 42. As additionally shown, the fluid dam 50 may be disposed between the rotor 36 and the stator 38.

The fluid dam 50 is configured to guide the fluid 34 around the stator 38 and shield the rotor 36 from the fluid flowing or dripping past and through the stator. Such shielding action of the fluid dam 50 limits an amount of the fluid 34 in the air gap 39 between the rotor 36 and the stator 38 and operates to control or reduce spin losses in the motor/generator 18, 20. The fluid dam 50 may be fixed directly to the stator 38. As shown in FIG. 2, the fluid dam 50 may have a curved or an upside down bowl-like shape and extend substantially around the entire top half 38-1, such that the fluid is assured of not dripping onto the rotor 36. In the present case, the term "substantially" means that the fluid dam 50 may extend to within +/−20 degrees of the 180 degrees spanned by the top half 38-1 of the stator. The fluid dam 50 may be attached to the stator 38 either under or above the wire windings 40, whichever is deemed more appropriate for specific space and packaging constraints within the motor/generator 18, 20.

Figure 6:
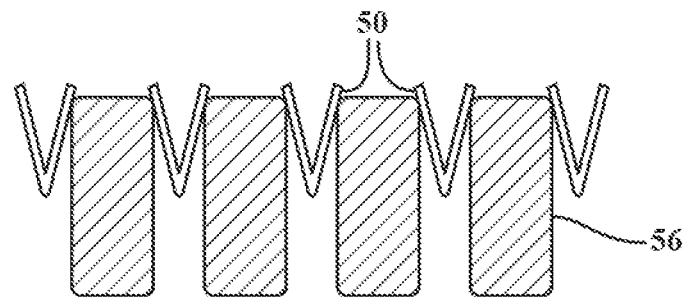
FIG. 6 is a close up cross-sectional view of the fluid dam according to yet another embodiment.
Figure 7:
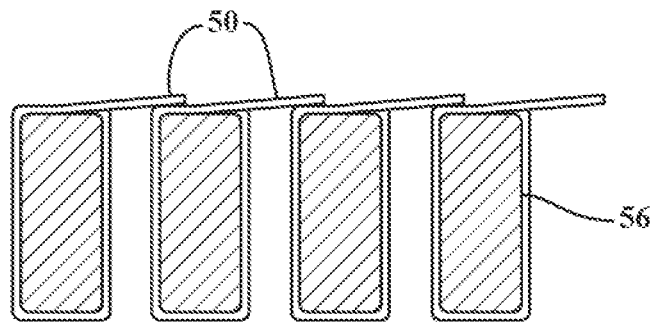
FIG. 7 is a close up cross-sectional view of the fluid dam according to yet another embodiment.

As may be seen in FIG. 2, the wire windings 40 include wire end turns or loops 52. The fluid dam 50 may be configured as a plurality of paper wedges (shown in FIG. 6) or plugs (not shown) that are inserted into the pre-wound wire loops 52 and then sealed or covered with a varnish for reliable retention. The fluid dam 50 plugs may be formed from high-temperature resistant foam, which may become impregnated by the described varnish during final preparation of the stator 38. As shown in FIG. 3, the stator 38 may include a plurality of interspaced slots 54. The slots 54 are typically included to generate desired distribution of instantaneous magnetic field in electric motors such as the motor/generators 18 and 20. In the case of the motor/generator 18, 20 having slots 54, the fluid dam 50 may reduce dripping of the fluid 34 through the slots, the air gap 39, and onto the rotor 36. As shown in FIG. 7, each of the plurality of slots 54 may be wrapped in a slot liner 56. The fluid dam 50 may be configured as an extension or flap of the slot liner 56.

As shown in FIGS. 2-5, the motor/generator 18, 20 may also include a cup 58 that is disposed directly below the bottom half 38-2 of the stator 38. The cup 58 is configured to catch the fluid 34 that is guided around the stator 38 by the fluid dam 50. Accordingly, as shown in FIG. 3, the cup 58 extends around the bottom half 38-2 of the stator 38 sufficiently to catch at least some of the fluid coming off the fluid dam 50. In other words, in a horizontal plane 59, the cup 58 extends beyond the span of the fluid dam 50. The cup 58 may define a volume 60 and be shaped sufficiently to immerse and cool at least a portion of the bottom half 38-2 in the caught fluid 34. The cup 58 may be fixed relative to the stator 38. Additionally, the cup 58 may have a lower-most or bottom portion 62 defining a drain 64 configured to limit dwell time of the fluid 34 within the cup. In other words the drain 64 defines an aperture that is sufficient to syphon the fluid 34 from the cup 58 at a predetermined rate.

The cooling and lubrication facilitated by fluid dam 50 and cup 58 is beneficial to the electric motor/generators 18, 20, in removing thermal stress frequently seen by the wire windings 40 when electric current is repeatedly passed through the wire windings during operation of the EVT 22. Accordingly, continuous cooling via fluid 34 being discharged onto the wire windings 40 would serve to reduce temperature of the stator 38 and increase operating window, longevity, and reliability of the particular electric motor/generator 18 or 20. Furthermore, gravity could be used to deposit the fluid 34 onto the wire windings, while the fluid dam 50 alone, or along with the bottom portion 62, may be advantageously employed for effective cooling and/or lubrication of the stator 38 via the fluid without increasing spin losses in the subject motor/generator 18, 20.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An electro-mechanical drive-unit connectable with at least one power source for launching and propelling a vehicle, comprising:
    an input member and an output member;
    a drive-unit housing;
    a gearing arrangement operatively connected to each of the output and input members;
    a pump configured to circulate fluid inside the drive-unit housing; and
    an electric motor including:
        a rotor operatively connected to the gearing arrangement;
        a stator surrounding the rotor, having a top half, a bottom half, and wire windings, and fixed with respect to the drive-unit housing, wherein the stator is cooled by gravity feed via the fluid flowing onto and past the top half; and
        a fluid dam fixed relative to the drive-unit housing and configured to guide the fluid around the stator and shield the rotor from the fluid flowing past the top half of the stator, such that the fluid is assured of not dripping onto the rotor, thereby limiting an amount of the fluid between the rotor and the stator such that spin losses in the electric motor are controlled.

2. The electro-mechanical drive-unit according to claim 1, further comprising a cup disposed directly below the bottom half of the stator and configured to catch the fluid that is guided around the stator sufficiently to immerse and cool at least a portion of the bottom half of the stator in the caught fluid.

3. The electro-mechanical drive-unit according to claim 2, wherein the cup is fixed relative to the stator.

4. The electro-mechanical drive-unit according to claim 2, wherein the cup includes a bottom portion defining a drain, and wherein the drain is configured to limit dwell time of the fluid within the cup.

5. The electro-mechanical drive-unit according to claim 1, wherein the fluid dam is fixed to the stator.

6. The electro-mechanical drive-unit according to claim 5, wherein the fluid dam has a curved shape and is attached to the stator under the wire windings.

7. The electro-mechanical drive-unit according to claim 5, wherein the fluid dam has a curved shape and is attached to the stator above the wire windings.

8. The electro-mechanical drive-unit according to claim 1, wherein the stator includes a plurality of slots and the dam reduces dripping of the fluid through the plurality of slots and onto the rotor.

9. The electro-mechanical drive-unit according to claim 8, wherein the slots are wrapped in a slot liner and the fluid dam is configured as an extension of the slot liner.

10. The electro-mechanical drive-unit according to claim 1, wherein the wire windings include wire loops and the fluid dam is configured as a plurality of plugs that are inserted into the loops.

11. An electric motor comprising:
    a rotor;
    a stator surrounding the rotor, having a top half, a bottom half, and wire windings, and fixed with respect to the drive-unit housing, wherein the stator is cooled by gravity feed via a fluid supplied by an external source and flowing onto and past the top half; and
    a fluid dam fixed relative to the stator and configured to guide the fluid around the stator and shield the rotor from the fluid flowing past the stator, such that the fluid is assured of not dripping onto the rotor, thereby limiting an amount of the fluid between the rotor and the stator such that spin losses in the electric motor are controlled.

12. The electric motor according to claim 11, further comprising a cup disposed directly below the bottom half of the stator and configured to catch the fluid that is guided around the stator sufficiently to immerse and cool at least a portion of the bottom half of the stator in the caught fluid.

13. The electric motor according to claim 12, wherein the cup is fixed relative to the stator.

14. The electric motor according to claim 12, wherein the cup includes a bottom portion defining a drain, and wherein the drain is configured to limit dwell time of the fluid within the cup.

15. The electric motor according to claim 11, wherein the fluid dam is fixed to the stator.

16. The electric motor according to claim 15, wherein the fluid dam has a curved shape and is attached to the stator under the wire windings.

17. The electric motor according to claim 15, wherein the fluid dam has a curved shape and is attached to the stator above the wire windings.

18. The electric motor according to claim 11, wherein the stator includes a plurality of slots and the dam reduces dripping of the fluid through the plurality of slots and onto the rotor.

19. The electric motor according to claim 18, wherein the slots are wrapped in a slot liner and the fluid dam is configured as an extension of the slot liner.

20. The electric motor according to claim 11, wherein the wire windings include wire loops and the fluid dam is configured as a plurality of plugs that are inserted into the loops.

* * * * *